United States Patent [19]
Arai et al.

[11] Patent Number: 6,026,789
[45] Date of Patent: Feb. 22, 2000

[54] REGULATOR FOR GAS FUEL ENGINE

[75] Inventors: Nobuo Arai; Naoyuki Enjoji, both of Saitama, Japan

[73] Assignee: Honda Giken Kogyo Kabushiki Kaisha, Tokyo, Japan

[21] Appl. No.: 09/093,093

[22] Filed: Jun. 8, 1998

[30] Foreign Application Priority Data

Jun. 23, 1997 [JP] Japan ................................ 9-181708

[51] Int. Cl.$^7$ .................................................. F02M 21/06
[52] U.S. Cl. ............................................................ 123/557
[58] Field of Search .................................. 123/557, 543, 123/545, 546, 547, 549

[56] References Cited

U.S. PATENT DOCUMENTS

| | | | |
|---|---|---|---|
| 4,092,963 | 6/1978 | Vrooman | 123/557 |
| 4,688,537 | 8/1987 | Calkins et al. | 123/557 |
| 4,811,720 | 3/1989 | Katumata et al. | 123/557 |
| 5,010,868 | 4/1991 | Clements | 123/557 |
| 5,483,943 | 1/1996 | Peters | 123/557 |

FOREIGN PATENT DOCUMENTS 7-189813  7/1995  Japan.

*Primary Examiner*—Marguerite McMahon
*Attorney, Agent, or Firm*—Armstrong, Westerman, Hattori, McLeland and Naughton

[57] ABSTRACT

A regulator for compressed natural gas is prevented from being frozen and from being heated to higher than a degree appropriate for prevention of the freezing.

A hot-water passage 11 for circulating a portion of the engine cooling water is provided adjacent to a gas passage 24 equipped with a reducing valve 21 in the primary decompression section A of the regulator. A hot-water outlet member 10 is provided at the outlet aperture of the hot-water passage 11. A temperature sensitive valve 42 is mounted in the hot-water outlet member 10 and is set so that the hot-water passage 11 is closed with the valve body 48 when the temperature of the hot-water exceeds the degree appropriate for prevention of the freeze at the outlet aperture.

9 Claims, 4 Drawing Sheets

REGULATOR FOR GAS FUEL ENGINE

BACKGROUND OF THE INVENTION

1. Field of the Invention

The present invention relates to a regulator for a gas fuel engine and particularly, to a regulator for a gas fuel engine capable of preventing deterioration in the quality of components caused by excessive heat-input that is supplied from a frozen preventing means.

2. Description of the Related Art

The use of compressed natural gas (CNG) as a fuel for automobiles has been focused in view of the energy saving and the environmental anti-pollution. In general, the compressed natural as stored at high pressure in a gas container mounted in the rear part of a vehicle and supplied to the engine. Prior to supplied to the engine, the compressed natural gas shall be decompressed and mixed with a proper amount of air. For decompression of the natural gas, in general, a regulator is provided in a midway of a gas supply conduit between the gas container and the engine.

It is however known that the decompression in the regulator causes adiabatic expansion thus resulting in sharp cooling down to freeze the regulator. For preventing such freezing of the regulator, a variety of measures have been developed. For example, Japanese Patent Laid-open Publication No. (Hei) 7-89813 discloses a system in which a cooling water conduit for feeding hot water from the water jacket of the engine to the heat exchanger in a cabin of a vehicle has a branch which extends across a water passage in the regulator to warm up the regulator with the hot water. The regulator is thus prevented from freezing by a flow of the hot water in the water passage and will hence be ensured in smooth action of pressure control.

Any conventional regulator has the following problems. As the atmospheric temperature rises or the load to the engine soars, the cooling water may be increased in the temperature and thus the temperature of its portion in the water passage of the regulator rises up excessively. Such an excessive rise in the temperature of the cooling water in the water passage, over a degree appropriate for prevention of freezing may especially deteriorate the elasticity of rubber materials of particular components those made of rubber materials in the regulator during a long service period. When the elasticity of the materials is declined, the effective clamping force will decrease or the accuracy of the pressure control will be degraded.

SUMMARY OF THE INVENTION

It is an object of the present invention to provide a regulator for a gas fuel engine in which the above problem is eliminated and the deterioration of rubber components is attenuated through preventing the excessive temperature rise thus improving the durability.

According to the present invention, a regulator for a gas fuel engine which controls the pressure of a gas to be supplied as a fuel to the engine of a water-cooling type, comprises a main body block having a hot-water passage provided therein, a passage means for circulating a cooling water from the engine to the hot-water passage, and an opening controller means for closing an outlet aperture of the hot-water passage when a temperature of the cooling water at or around the outlet of the hot water passage is higher than a predetermined degree and opening it when the temperature is not higher than the degree.

In operation, the regulator is heated by the hot water and thus prevented from being frozen due to adiabatic expansion of the gas. Also, when the hot water temperature exceeds the degree appropriate for prevention of the freezing, the circulation of the hot water to the regulator is quitted by the action of the opening controller means, thus preventing the temperature of the regulator from rising excessively.

DETAILED DESCRIPTION OF THE PREFERRED EMBODIMENT

Figure 5:
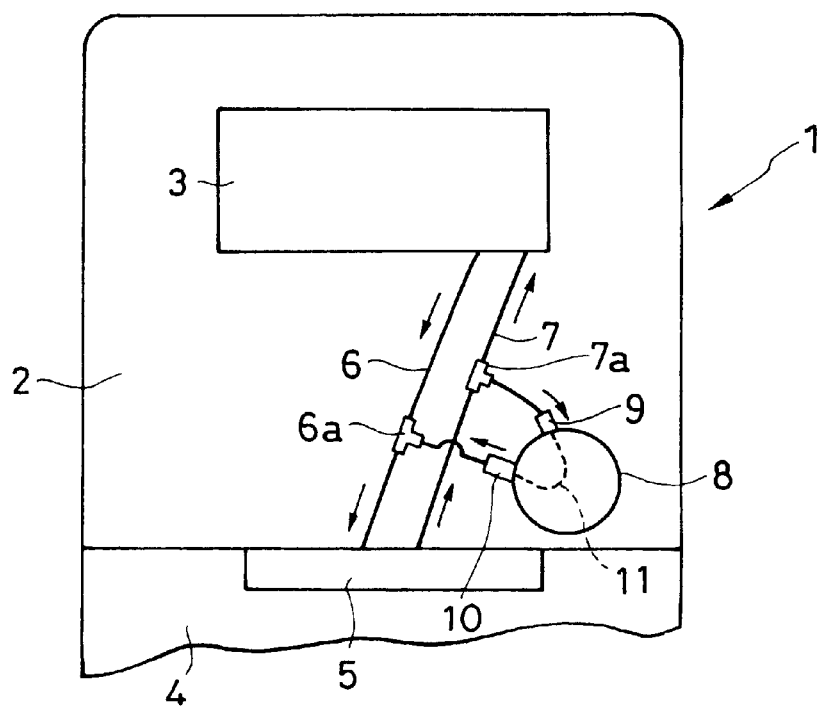
FIG. 5 is a systematic diagram of the cooling water for an engine.

The present invention will be described in more detail referring to the accompanying drawings. FIG. 5 is a schematic view of a primary part at the front of an automobile provided with a regulator for compressed natural gas (referred to as "gas" hereinafter), showing one embodiment of the present invention. While an engine 3 is mounted in an engine room 2 at the front part of a vehicle 1, conduits 6 and 7 are provided for circulating cooling water between a water jacket (not shown) of the engine 3 and a heat exchanger 5 in a cabin 4 of the vehicle. The direction of the cooling water circulation is denoted by the arrows.

The two conduits 6 and 7 have junctions 6a and 7a in a midway thereof respectively. A conduit branching off from the joint 7a of the conduit 7 extends to a hot-water inlet port 9 of the regulator 8. While, a conduit branching off from the joint 6a of the conduit 6 extends to a hot-water outlet member 10 of the regulator 8. The hot-water outlet member 10 includes a hot-water stop valve which will be explained later in more detail. Accordingly, a portion of the cooling water forced from the heat exchanger 5 to the engine 3 is fed to the hot-water inlet port 9, passed through a hot-water passage 11 in the regulator 8, discharged from the hot-water outlet member 10, and returned back via the conduit 6 to the heat exchanger 5.

The regulator 8 is designed for decompressing the gas supplied from a gas container (not shown) to a pressure suited for fuel injection into the engine 3. A piping between the gas container and the engine 3 is hardly related to the feature of the present invention and not illustrated.

Figure 1:
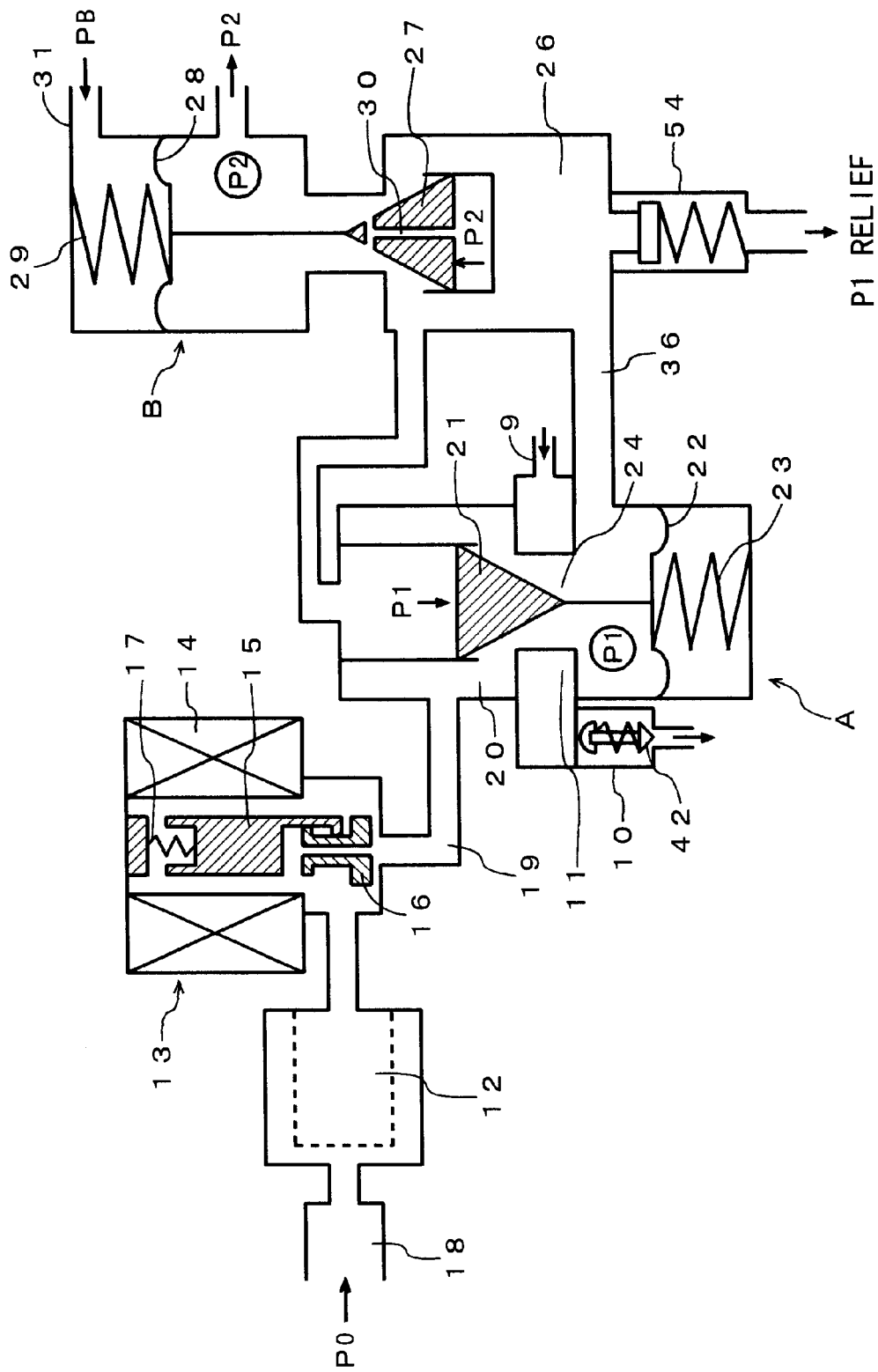
FIG. 1 is a schematic view of a construction of a regulator according to an embodiment of the present invention.

The regulator 8 is explained in more detail. FIG. 1 is a schematic view showing a construction of the regulator 8. The regulator 8 comprises a primary decompression section A and a secondary decompression section B. The primary decompression section A includes, at a first stage, a filter 12 for removing impurities from the gas and an electromagnetic stop valve 13 for closing the gas passage when the engine is stopped. The electromagnetic valve 13 opens when its coil 14 is energized to draw in its plunger 15 and lift up its valve member 16 while the engine operates. For closing the electromagnetic valve 13 while the engine is stopped, the coil 14 is deenergized allowing the plunger 15 to be pressed down by a compression spring 17 and the valve member 16 to be pushed down.

The gas supplied from the gas container and its feed line (not shown) is introduced into an entrance 18 of the regulator 8, filtered by the filter 12 for removal of impurities, passed through a passage 19 with the stop valve 13 opened, and brought into a pressure chamber 20 of the primary decompression section A. The gas supplied from the gas container has a pressure Po of 10 to 250 kgf/cm2 and the interior of the compression chamber 20 is conditioned at the same pressure as Po.

Also, the primary decompress on section A includes a valve member 21, a diaphragm 22 supporting the valve member 21, and a compression spring 23 which urges the diaphragm 22 for controlling the pressure of the gas in the primary decompression section A. A pressure of P1 equal to the gas pressure after the decompression in the primary decompression section A is applied as a back pressure on the upper surface of the valve member 21 opposite to the diaphragm 22 side. P1 may be adjusted to be such as 6 to 7 kgf/cm2. A water or a hot-water passage 11 for preventing freeze is provided, according to the present invention, adjacent to and around the passage 24 which is opened or closed with the valve member 21 because the decompression from Po to P1 causes a sharp drop in the temperature of the gas. The hot water from the junction 7a (FIG. 5) is supplied via the hot-water inlet port 9 to the hot-water passage 11 and discharged via the hot-water outlet member 10 to the junction 6a. The hot-water outlet member 10 is provided with a hot-water stop valve or temperature sensitive valve 42 which is preset for closing the hot-water outlet member 10 when the temperature of the hot water reaches to a predetermined degree. The hot-water outlet member 10 with the temperature sensitive valve 42 will be explained later in more detail.

The gas decompressed in the primary decompression section A is delivered via a passage 36 to a pressure chamber 26 of the secondary decompression section B. The secondary decompression section B includes, similar to the primary decompression section A, a valve member 27, a diaphragm 28 supporting the valve member 27, and a compression spring 29 which urges the diaphragm 28 for controlling the pressure of the gas in the secondary decompression section B. A back pressure passage 30 is provided through the valve member 27 for applying a pressure P2 of the gas decompressed in the secondary decompression section B as the back pressure to the lower side of the valve member 27 opposite to the side where the diaphragm 28 is present.

A negative pressure PB is introduced from an intake manifold (not shown) via a pressure inlet 31 to the upper surface of the diaphragm 28. In the secondary decompression section B, the pressure P2 or a differential pressure between the negative pressure PB and the injection pressure on a fuel injector is maintained to a constant value, for example, 2.8 kgf/cm2 in this embodiment. The regulator 8 is provided with a relief valve 54 for preventing the pressure P1 from excessive increase. The relief valve 54 may be set, for example, to a pressure of 15 to 18 kgf/cm2.

Figure 2:
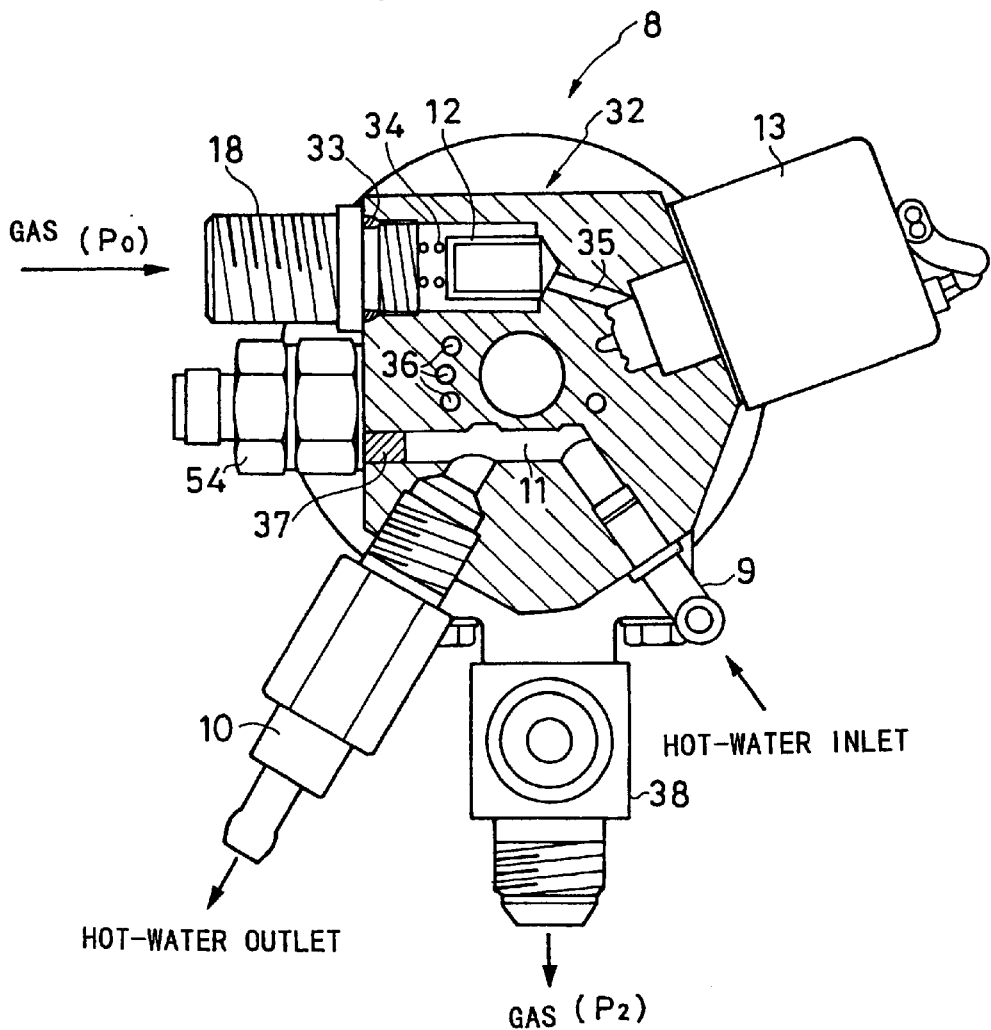
FIG. 2 is a cross sectional view of a primary part of the regulator of the embodiment of the present invention.

The construction of the regulator 8 is now explained in more detail. FIG. 2 is a cross sectional view of a primary part of the regulator 8. As shown, the gas inlet nipple 18 with a seal 33 is airtightly threaded into a cavity in a main block 32 of the regulator 8 for introducing the gas at the pressure Po into the regulator 8. The filter 12 is accommodated in the cavity of the main body block 32 and remains urged by a compress on spring 34 against the inner wall surface of the cavity for tightening. The electromagnetic stop valve 13 and the filter 12 are communicated with each other by a passage 35. The gas at the pressure Po is received through the gas inlet nipple 18 and passed via the filter 12 and the electromagnetic stop valve 13 to the primary decompress-on chamber A (FIG. 1).

The passage 36 follows to the passage 24 of the primary decompression chamber A for directing the gas, which is discharged from the electromagnetic stop valve 13 to be decompressed, to the pressure chamber 26 of the secondary decompression section B. The relief valve 54 is fixedly mounted to the main body block 32 for fluidical connection to the pressure chamber 26 provided at the following stage of the passage 36.

The main body block 32 has the hot-water passage 11 comprising three bores provided therein by drilling from three directions and fluidically connected each other at their inner ends. The first bore is connected at its outer end to the hot-water inlet port 9 and the hot-water outlet member 10 is threaded in at the outer end of the second bore. The outer end of the third bore is airtightly closed with a plug 37. The hot-water passage 11 is preferably provided in a central region of the main body block 32 adjacent to the gas passage 36 so that the hot water running in the hot-water passage 11 prevents the main body block 32 from being frozen or excessively refrigerated. An outlet nipple 38 is provided for supplying the engine 3 with the gas at the pressure P2 decompressed at the secondary decompression section B.

Figure 3:
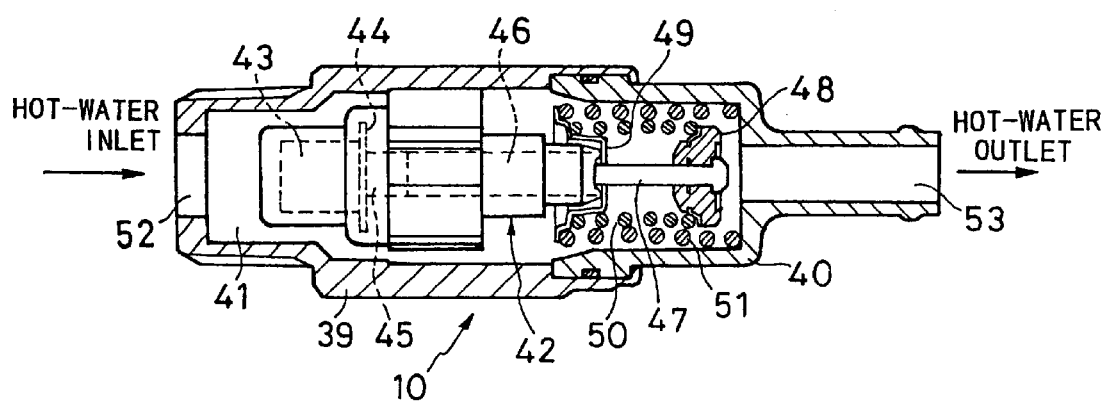
FIG. 3 is a cross sectional view of a hot-water outlet port provided with a hot-water stop valve.

The hot-water outlet member 10 with the hot-water stop valve is explained with reference to FIG. 3 which shows a cross sectional view of the hot-water outlet member 10. As shown, the hot-water outlet member 10 has a space or cavity 41 provided with a body 39 and a cap 40 thereof. A temperature sensitive valve 42 is located in the space 41 and anchored to the inner wall of the body 39 by a support 42A. The temperature sensitive valve 42 includes a wax reservoir 43 filled with a wax which is meltable at a given temperature. The wax reservoir 43 is sealed with a diaphragm 44 which serves as a cover. In this embodiment, a type of the wax is used having a melting temperature of 70 degrees centigrade. A cushion member 45 of a rubber material is directly contacted at one end to the diaphragm 44 and at the other end to a piston 46.

A rod 47 is mounted to the front end of the piston 46. A valve member 48 made of rubber is mounted to the front end of the rod 47 for sliding movement on the rod 47. A holder 49 of a cup-like shape is also mounted to the front end of the piston 46 and a compression spring 50 is provided between the holder 49 and the valve member 48 for urging the valve member 48 towards the front end of the rod 47. Also, a second compression spring 51 is provided between the outer rim of the holder 49 and the inner wall of the cap 40 for urging the holder 49 and thus the rod 47 toward the diaphragm 44.

The hot water received at an inlet aperture 52 of the space 41 flows through the space 41 and is discharged from an outlet aperture 53. When the hot water has a higher temperature than the melting temperature of the wax, the wax is melted to expand. This causes the diaphragm 44 to be outwardly bent and press forward the cushion member 45, and thus the piston 46 directly contacted to the cushion member 45 is urged. Accordingly, the rod 47 and the holder 49 assembled together with the piston 46 are moved towards the outlet aperture 53 as pressing against the compression spring 51. Hence, the valve member 48 is pressed against the inner wall of the cap 40 to close the outlet aperture 53. Simultaneously, the compression spring 50 is compressed and produces a counter force to press the valve member 48 against the inner wall of the cap 40.

Preferably, the outlet aperture 58 is not completely closed with the valve member 48 but provides a very small leak gap. When the flow of the hot water is interrupted with its leak portion allowed to escape, the response characteristic of the temperature sensitive valve 42 may be improved. In this embodiment, the leak portion is set to 150 cc/minute. This is implemented by having a step on at least one of the valve member 48 and the inner wall of the cap 40 to avoid entire direct contact between them.

When the temperature of the hot water in the hot-water outlet member 10 drops down, the wax is solidified to decrease in volume. This allows the compression spring 51 to press back the holder 49 and thus the piston 46. Accordingly, the valve member 48 departs from the inner wall of the cap 40 to open the outlet aperture 53 causing the hot water flow through.

Figure 4:
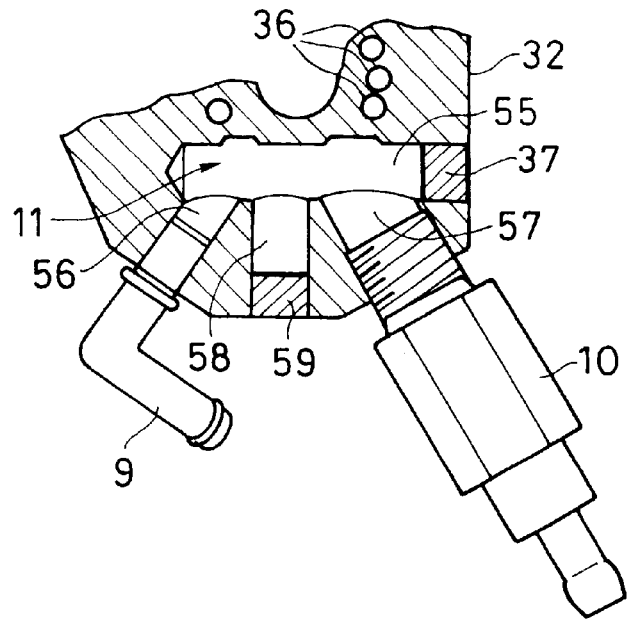
FIG. 4 is a cross sectional view of a primary part of a modification of the regulator according to the present invention.

The above embodiment may be modified as follows. FIG. 4 is a cross sectional view of a modification of the regulator, where like components are denoted by like numerals as those shown in FIG. 2. In the modification, the hot-water passage 11 is enlarged to increase the surface area of the inner wall. The hot-water passage 11 is formed in the body block 32 by drilling a main bore 55 from right in FIG. 4 and then boring three bores 56, 57 and 58 from three different directions to the main bore 55. In addition to the main bore 55, provided are the bore 56 for connecting to the hot-water inlet port 9, the bore 57 for connecting to the hot-water outlet member 10, and a bore 58 as a branch of the main bore 55 between the two bores 56 and 57. The bore 58 is closed airtightly with a plug 59. The bore 57 is greater in the diameter than that shown in FIG. 2. As the inner wall surface area of the passage 11 is increased, the heat of the hot water can more highly be propagated to the main body block 32 of the regulator 8. Although the single branch is made in the modification in FIG. 4, two or more bores can be extended from the main bore 55 as long as the main body block 32 has a space for the bores.

In this embodiment, the wax is provided as a medium for urge the piston 46, however, other materials which is melted at predetermined temperature same as a melting temperature of the wax can be used instead of the wax.

Figure 6:
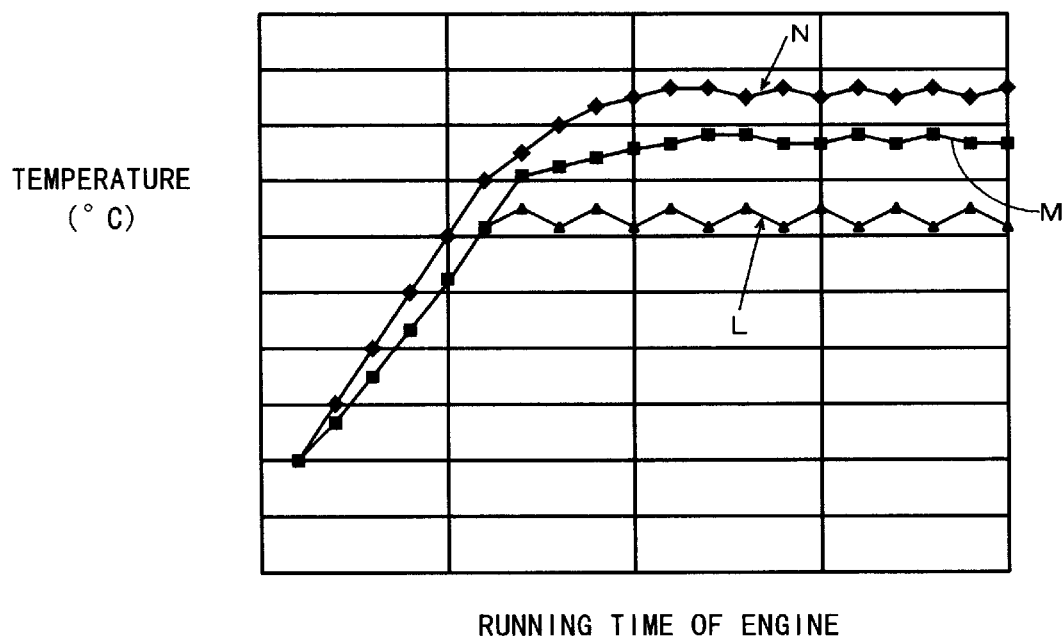
FIG. 6 is a diagram showing a relation between the temperature of the regulator and the running time of the engine.

The regulator of the present embodiment is now compared with a conventional regulator in the term of temperature. FIG. 6 illustrates the relation between the regulator temperature and the running time of the engine also indicating the temperature of the cooling water for the engine. A curve L represents the temperature of the regulator according to the modification of the embodiment, a curve M the temperature of the conventional regulator without hot-water stop valve, and a curve N the temperature of the cooling water for the engine in relation to the running time of the engine. The temperature of the cooling water was measured at the entrance of the regulator 8. As apparent, the temperature of the regulator 8 was maintained at a degree lower than hat of the conventional regulator and appropriate for the pressure control.

As set forth above, the regulator defined in any of claims 1 to 9 is heated by the hot water thus attenuating the temperature drop due to adiabatic expansion of the gas and preventing from being frozen. In particular, when the temperature of the hot water rises higher than a degree appropriate for prevention of the freezing, the circulation of the hot water through the regulator is quitted to avoid the operation of the regulator at an excessive high temperature. Accordingly, the components in the regulator will be presented from being sharply degraded and their operation for the pressure control will be ensured in a longer period of time.

As defined in claim 6, the contact area of the regulator with the hot water is increased by the presence of a branch bore, thus controlling the temperature rise at a higher reliability. Moreover, as defined in claim 7, the hot-water stop valve permits a small amount of leak when it is closed, hence producing a higher degree of the operational response.

What is claimed is:

1. A regulator for a gas fuel engine which includes a main body block and controls the pressure of a gas to be supplied as a fuel to the engine of a water-cooling type, comprising:

a hot-water passage passing through the main body block, and being adapted to be supplied with a cooling water from the engine;

an opening control means for closing an outlet aperture of the hot-water passage when the temperature of the cooling water is higher than a predetermined degree at the outlet aperture and opening it when the temperature is not higher than the predetermined degree; and a hot-water outlet member containing the opening control means, wherein the hot-water outlet member is provided on an outside wall of the main body block.

2. A regulator for a gas fuel engine according to claim 1, wherein the opening control means is a temperature sensitive valve comprising a diaphragm which is biased when the temperature of the cooling water is higher than a predetermined degree at the outlet aperture and a valve member responsive to the bias motion of the diaphragm for forward and backward movements to open and close the outlet aperture.

3. A regulator for a gas fuel engine according to claim 2, wherein the diaphragm is a cover of a reservoir filled with a material which is melted and solidified corresponding to variation of the temperature of the cooling water at predetermined temperature.

4. A regulator for a gas fuel engine according to claim 3, wherein the material is a wax which is melted and solidified corresponding to variation of the temperature of the cooling water at predetermined temperature.

5. A regulator for a gas fuel engine according to claim 2, wherein the temperature sensitive valve is assembled integral with the main body block.

6. A regulator for a gas fuel engine according to claim 1, wherein the hot-water passage comprises a main passage passing through the main body block and a branch extending from the main passage to broaden the surface area of the passage.

7. A regulator for a gas fuel engine according to claim 2, wherein the hot-water valve is arranged to pass a predetermined small amount of the hot water as a leak when it is closed.

8. A regulator for a gas fuel engine according to claim 1, wherein the regulator includes a primary decompression section and a secondary decompression section and the hot-water passage is located adjacent to at least the primary decompression section.

9. A regulator for a gas fuel engine according to claim 1, wherein the passage means is a passage branching out from a conduit for circulating the cooling water between the engine and a heat exchanger in a cabin.

\* \* \* \* \*